Feb. 3, 1959      E. W. WORK      2,871,877
PRESSURE RELIEF VALVE
Filed Dec. 16, 1953
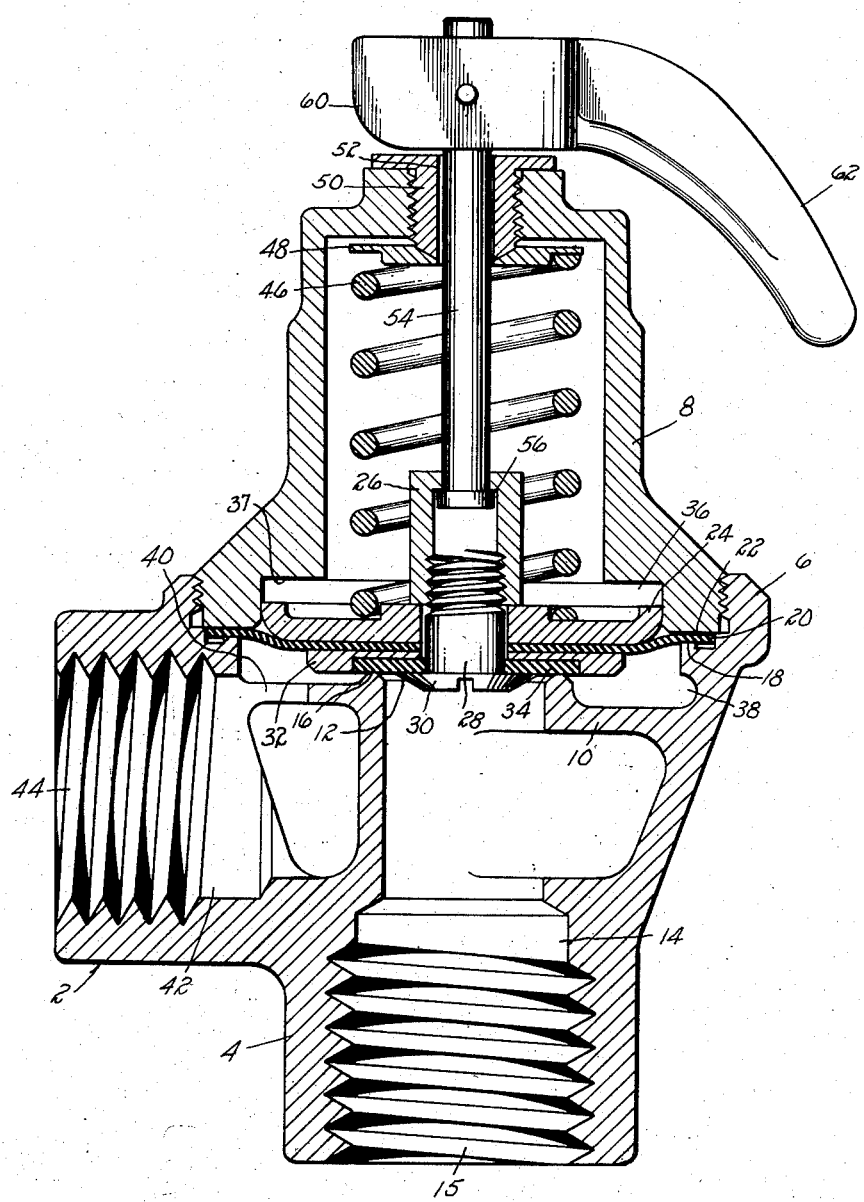
INVENTOR
ERICH W. WORK
BY
*Lindsey and Prutzman*
ATTORNEYS

United States Patent Office 2,871,877
Patented Feb. 3, 1959

2,871,877

PRESSURE RELIEF VALVE

Erich W. Work, New Britain, Conn., assignor to Beaton & Cadwell Mfg. Co., New Britain, Conn., a corporation of Connecticut Application December 16, 1953, Serial No. 398,459

4 Claims. (Cl. 137—469)

This invention relates to pressure relief valves for hot water heating systems and the like, and more particularly to a relief valve having a selectively larger flow capacity for steam generated in the system than for water.

Attempts to achieve selective operation of this kind have generally relied upon the use of a main valve having a concentric auxiliary valve known as a "steam lip" which delays the closing of the main valve during the relief of steam. Such arrangements, however, do not attain the desired degree of selectivity between steam and hot water, require the provision of an additional valve seat to coact with the "steam lip," and are subject to objectionable chattering and vibration during operation. Moreover, to accommodate the concentric auxiliary valve structure, valves of the "steam lip" type must be larger and heavier than desired, and hence are costly to manufacture.

An object of the present invention, therefore, is to provide an improved pressure relief valve having a selectively larger flow capacity for steam than for water, which is of simplified construction and can be manufactured at reduced cost.

A further object is to provide a pressure relief valve having only a single valve seat, and having increased steam flow capacity relative to the physical size of the valve, while providing a flow capacity for hot water sufficient only to relieve excess pressure without loss of an excessive amount of water from the system.

Another object is to provide a valve of the character described so constructed and arranged as to merely crack open as necessary to relieve excessive pressure of liquids, such as hot water, while popping completely open responsive to like pressures of gases, such as steam.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing, the single figure is a sectional view of a pressure relief valve constructed in accordance with the present invention.

Referring to the drawing, a preferred embodiment of a relief valve constructed in accordance with the present invention includes a casing 2 having an L-shaped bottom portion 4 provided with an internally threaded flange 6 for receiving a somewhat cylindrical top portion 8. Spaced from the flange 6, there is provided in bottom portion 4 a rigid partition or wall 10 disposed generally perpendicular to the axis of top portion 8. The wall is apertured at its center to provide an inlet orifice 12 which is connected to an inlet port 14 provided in casing 2, and having internal threads 15. The orifice 12 is formed with a valve seat 16 slightly upraised from rigid wall 10.

Adjacent the bottom end of the internally threaded flange 6, the casing is provided with an annular ledge or shelf 18 on which is supported the periphery of a flexible diaphragm 20. The diaphragm 20 is securely clamped to shelf 18 by the abutting opposed face 22 of the inner end of top portion 8, and is provided with a circular backing plate 24 to increase its stiffness. Diaphragm 20 is substantially larger in area than inlet orifice 12, having in the embodiment shown in the drawing an area approximately seven times that of orifice 12. Centrally supported on the backing plate is an internally threaded cup member 26. The backing plate 24 and diaphragm 20 are provided with central holes through which extends a bolt 28 which is threaded into the cup member 26. Bolt 28 has an enlarged head 30 at its lower end which provides a flange for supporting disc-shaped valve 32 from diaphragm 20. Valve 32 has an annular slot in which a flexible gasket 34 is retained by the head of bolt 28. The arrangement is such that when bolt 28 is securely tightened into the cup member 26, the cup member, backing plate 24, diaphragm 20, valve 32, and gasket 34 are securely clamped together to provide a unitary structure. Top portion 8 is provided with an internal annular groove 36 to afford a clearance space to permit upward displacement of diaphragm 20 and backing plate 24. Bottom 37 of groove 36 provides a stop for plate 24 when the valve 32 opens fully. The diaphragm 20 and the rigid wall 10 opposite thereto, together with the portion of the casing between the two, form an expansion chamber 38 for a purpose hereinafter described.

The backing plate 24 is only slightly smaller in diameter than shelf 18, so that a large part of the area of diaphragm 20 is rigidly supported by plate 24 against pressures in chamber 38, with only the small annular portion of the diaphragm adjacent the shelf 18 being able to flex relative to casing 2. In this way, diaphragm 20 in effect acts like a piston or stiff displaceable wall for chamber 38. Of course, it should be recognized that the combination of diaphragm 20 and backing plate 24 is only one embodiment of a displaceable wall which may be provided for chamber 38, a flexible diaphragm of inherently stiff material such as metal or a conventional piston slidably supported at its periphery in casing 2 being equivalent structure for the purpose of the present invention.

Rigid wall 10 is provided at one side thereof with an aperture 40 which connects to an outlet port 42, threaded as at 44. Aperture 40 is preferably no larger than orifice 12, in order to create a slight back pressure in chamber 38. The diaphragm and its backing plate are biased downwardly to hold the valve 32 closed against the valve seat 16 by means of a compression spring 46 retained at its upper end by a spring retainer 48 supported against a bushing 50 threaded into the upper end of the top portion 8. Bushing 50 is provided with an axial bore 52 for slidably supporting a rod 54 having a flange 56 at it lower end retained within cup member 26. The cup member 26 is of such a length in relation to the length of the bolt 28 as to provide a clearance space between the end of the rod 54 and bolt 28 so that cup member 26 may be lifted with diaphragm 20 when valve 32 is opened without moving the rod 54. At its upper end rod 54 is provided with the usual cam 60 and hand lever 62 for lifting the same to open valve 32 manually.

Turning now to the operation of the valve, it will be appreciated that spring 46 biases the diaphragm 20 and valve 32 downwardly and holds the valve closed against valve seat 16 with a force of predetermined size as governed by the operating requirements of the system with which the valve is used. When the pressure of fluid in the system reaches a sufficient level to exert a force on the area of valve 32 exposed by inlet orifice 12 exceeding the force of spring 46, the valve 32 will be lifted a predetermined initial amount which preferably amounts to a relatively slight cracking of the valve. This will permit flow of fluid from inlet port 14 into the chamber 38. The volume of the chamber 38 is selected to be sufficiently large to permit substantially full expansion of the volume of liquid admitted to the chamber 38 in response to the initial movement of the valve 32, or, in other words, is of sufficient size to result in a reduction of the pressure of the liquid admitted to the chamber 38 to substantially that in the outlet port since the chamber 38 is vented to the outlet port 42 through aperture 40. The drop in pressure of the liquid flowing into chamber 38 will thus be sufficient that the effect of the pressure of the liquid in the chamber on the diaphragm 20 will be inconsequential. The valve 32 will, therefore, remain merely cracked open while the pressure in the inlet port is higher than the level for which the spring 46 is set. When sufficient liquid is vented through orifice 12 to drop the pressure in inlet port 14 below the desired maximum, valve 32 will immediately be returned to its closed position by spring 46 and thus a minimum amount of liquid, i. e. hot water, will be lost from the system.

In operation with steam or gas, the valve initially cracks open responsive to the same pressure in inlet port 14 as when the fluid is primarily liquid. However, the volume of the chamber 38 while being selected to provide full expansion of liquid admitted thereinto is further selected to be substantially insufficient to permit the full expansion of gases admitted thereinto in response to the initial cracking of the valve 32 or in response to full opening of the valve. Therefore, the pressure of the steam admitted into the chamber will not drop to the extent that pressure of a liquid would fall, and hence the steam in chamber 38 is able to exert a substantial force on the walls of the pressure chamber. Since the displaceable wall formed by the diaphragm 20 and backing plate 24 is substantially larger in area than the area of valve 32 exposed by inlet orifice 12, the steam in chamber 38, even though fallen in pressure from what it was in inlet port 14, is able to exert a force on the larger area of the diaphragm 20 which is greatly in excess of the force initially required to crack open the valve. Hence the movable wall formed by the backed-up diaphragm 20 acts like a piston, and is displaced upwardly an additional amount, carrying with it valve 32. Additional displacement of valve 32 away from valve seat 16, rather than diminishing the pressure on the displaceable wall, admits more steam into chamber 38, which further increases the pressure in the chamber and the force acting on the displaceable wall. The result is a self-amplifying action by which the existence of steam pressure in inlet port 14 only slightly in excess of that required to crack open the valve inititally causes the movable wall to be displaced to the full upper limit of its travel. This lifts valve 32 far enough off valve seat 16 for a full orifice opening of orifice 12, and thus provides a completely unobstructed vent for steam, which has a greatly increased flow capacity in comparison with that allowed for hot water.

Thus, even though the valve assembly above described may be of reduced physical size, and employs a single valve 32 of simple flat disc-like shape, unencumbered by a "steam lip" or the like, it is capable when relieving steam of opening to a much larger extent than prior art valves of the conventional steam lip type, while also being capable of operating selectively with hot water to minimize water loss from the system.

Not until sufficient steam is vented to reduce the steam pressure in chamber 38 enough so that the force on diaphragm 20 can be overcome by spring 46, does valve 32 close. Thus, when the fluid in the system consists of a substantial amount of gas, i. e. steam, the valve 32 remains open, after it is once opened, sufficiently long to permit substantial steam flow out of the system. This is highly desirable, because it greatly increases the capacity of the valve, and, in emergency situations such as might be caused by a run-away boiler, insures that the system will be adequately safeguarded even though the physical size of the valve may be quite small.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a device of the character described, a casing provided with a rigid wall, a movable wall, inlet and outlet ports, and internal chambers providing a fluid conduit leading from said inlet port through said rigid wall into an expansion chamber adjacent said movable wall and forming a valve seat within said chamber, a fluid passage laterally of said valve seat connecting said chamber to said outlet port, a valve within said chamber carried by said movable wall in a position to contact said seat, means disposed externally of said wall to bias said valve under pressure against said seat, the area of said valve enclosed by said seat being substantially less than the area of said movable wall, the volume of said expansion chamber being large enough to permit rapid expansion and pressure reduction of inlet fluid from valve opening pressure to a value below that pressure, but small enough to permit substantial pressure reduction of steam entering said inlet port to open said valve, whereby the resulting steam pressure, acting on said movable wall, maintains said valve open until sufficient steam escapes through said outlet port to reduce the wall pressure below the biasing pressure.

2. A pressure relief valve comprising a casing, an expansion chamber in said casing having a diaphragm permanently closing one end thereof, said casing provided with an inlet port leading to a passageway terminating in a valve seat closely spaced from said diaphragm, said passageway having an area substantially smaller than said diaphragm, a closure valve carried by said diaphragm for engagement with said valve seat, a spring externally of said chamber for closing said valve, an outlet passage from said chamber positioned laterally of said valve and ported to the exterior of said casing, said outlet passage being no larger in area than the area of the valved fluid inlet, said chamber being of large enough volume rapidly to reduce valve opening pressure of incoming liquid to below the pressure required to maintain said valve open and being of small enough volume to allow steam admitted to said chamber to retain the valve open until sufficient steam escapes through said outlet port to reduce the diaphragm pressure to below that required to maintain said valve open.

3. A pressure relief valve having a high flow capacity for gases and a low flow capacity for liquids comprising a casing having a ported bottom portion and a cylindrical top portion connected thereto, a rigid partition in said bottom portion disposed normal to the axis of said top portion, an annular shelf in said bottom portion axially spaced from said partition and generally parallel thereto, a flexible diaphragm permanently sealed to said shelf at its periphery in spaced generally parallel relation with said partition to form with said partitions an expansion chamber, said partition provided with an inlet port for said chamber defined by a valve seat spaced from said diaphragm, and an outlet port laterally thereof leading to the exterior of said casing, said outlet port being at least no larger than said inlet port, a rigid backing plate for said diaphragm, a flat valve, positioned to engage said seat and carried by said diaphragm, means securing said valve, diaphrgm and backing plate firmly together for movement as a unitary structure, a compression spring in said top portion behind said backing plate urging said valve closed, whereby said valve will open an initial predetermined amount in response to a predetermined fluid pressure on said valve, said chamber being of a volume sufficient for the reduction of the pressure of liquid admitted to said chamber in response to said initial amount of valve displacement to a pressure substantially equal to that in the outlet for said chamber and being of a volume substantially insufficient for the reduction in pressure of gas admitted to said chamber in response to said initial amount of valve displacement to the pressure in said outlet, said diaphragm being of sufficient area to effect additional opening of said valve in response to the pressure of gases admitted to said chamber in response to said initial valve displacement.

4. A pressure relief valve having a high flow capacity for gases and a low flow capacity for liquids comprising a casing, an expansion chamber in said casing having a substantially rigid displaceable wall permanently closing one end thereof, said casing being ported to provide an inlet passage leading into said chamber opposite said displaceable wall, said passage having an area substantially smaller than said displaceable wall, and provided with an outlet passage leading from said chamber at a position laterally of said inlet passage and having an area no larger than said inlet passage, a valve seat disposed in said chamber for the control of fluid from said inlet passage, a valve mounted on said displaceable wall engageable with said seat and exposed to pressure of fluid in said inlet, and a spring in said casing backing up said displaceable wall with a predetermined force to retain said valve in closed relation with said seat under normal operating conditions, whereby a predetermined pressure of fluid entering said inlet port displaces said valve an initial predetermined amount, said chamber being of a volume sufficient for the reduction of the pressure of liquid admitted to said chamber in response to said initial amount of valve displacement to a pressure substantially equal to that in the outlet for said chamber and being of a volume substantially insufficient for the reduction in pressure of gas admitted to said chamber in response to said initial amount of valve displacement to the pressure in said outlet.

References Cited in the file of this patent

UNITED STATES PATENTS

| | | |
|---|---|---|
| 1,182,030 | O'Dowd | May 9, 1916 |
| 2,585,575 | Nedergaard | Feb. 12, 1952 |
| 2,674,260 | Thrush | Apr. 6, 1954 |
| 2,695,032 | Kmiecik | Nov. 23, 1954 |

FOREIGN PATENTS

| | | |
|---|---|---|
| 597,093 | Germany | May 17, 1934 |